Patented Mar. 7, 1933

1,900,537

UNITED STATES PATENT OFFICE

LESTER V. ADAMS, OF SCHENECTADY, NEW YORK, ASSIGNOR TO GENERAL ELECTRIC COMPANY, A CORPORATION OF NEW YORK

CEMENTING COMPOSITION

No Drawing.  Application filed August 9, 1929. Serial No. 384,807.

This invention relates to a new and improved cementing composition.

Cementing compositions of the class to which this invention relates are, in general, of two types. These are (1) the resin type, and (2) the rosin-linseed oil type. An example of a cementing composition of the first type is a gum, such for example as dammar gum, dissolved in a solvent such as alcohol; or shellac dissolved in alcohol. An example of the second type is a varnish base, such as rosin and linseed oil, dissolved in solvent, such as naphtha. Cementing compositions of these types become brittle with age and material containing such compositions cracks when bent.

It has long been desirable to obtain a cementing composition which will have good adhesive properties, which will hold its flexibility under heat, and which has long life. I have discovered such a composition. My new and improved cementing composition consists briefly of a modified alkyd resin to which is added a small proportion of a degelled oil which is homogeneously blended but uncombined with the resin. In my prior application Serial No. 118,604, filed June 25, 1926 which is a continuation in part of a prior application Serial No. 719,895, filed June 13, 1924, both applications being assigned to the assignee of the present invention, I have described a resinous composition containing degelled oil combined with an alkyd resin. As is known, alkyd resins include all those complexes resulting primarily from the inter-reaction of a polyhydric alcohol, such as glycerine, and a polybasic acid, such as phthalic anhydride, with or without other reacting ingredients.

In order to illustrate the preparation of the cementing composition of my invention the following formula and method of preparing the composition are given merely by way of example:

| Composition | Batch wt. | Percentage |
|---|---|---|
| Phthalic anhydride | 43.0 lbs. | 39.3% |
| Glycerine | 19.0 " | 17.4 |
| Linseed oil fatty acids | 12.5 " | 11.4 |
| China-wood oil fatty acids | 15.0 " | 13.7 |
| Degelled linseed oil | 20.0 " | 18.2 |
| | 109.5 lbs. | 100.0% |

All the ingredients except the degelled oil are heated together in a kettle to a maximum temperature of 190° C. until a sample of resin will cure on a 200° C. hot plate in 1½ minutes. The curing test is made by rubbing a thin film of the resin about the size of a dime on a hot plate. A nail or wire is drawn back and forth through the film and the time required for hardening noted. Then the degelled oil, which may be prepared from raw linseed oil in any known manner (as for example, by heating the raw oil at 300° C. until degelled) is added and the kettle heated until a clear blend is obtained. The base is hot cut with acetone to the required specific gravity which is about 1.135. The contents of the kettle should be stirred well during this operation.

The modified alkyd resin need not necessarily be one which is modified by the addition of fatty acids of oils during its preparation. For example, the oils themselves may be used, and as an illustration of the preparation of the cementing composition of my invention with such a modified alkyd resin, the following is given:

| Composition | Batch wt. | Percentage |
|---|---|---|
| Phthalic anhydride | 43.0 lbs. | 39.3% |
| Glycerine | 19.0 " | 17.4 |
| Linseed oil | 12.5 " | 11.4 |
| China-wood oil | 15.0 " | 13.7 |
| Degelled linseed oil | 20.0 " | 18.2 |
| | 109.5 lbs. | 100.0% |

The linseed and China-wood oils are heated to 280° C. cooled rapidly to 250° C. and the phthalic anhydride and glycerine added in this order. The resinous material is heated at 250° C. until a clear blend is produced. Then the oil is bodied at gradually reduced temperatures until a sample of resin cures on the hot plate as in the first case. The degelled oil is then added and blended.

My improved cementing composition is very flexible, will hold its flexibility under heat, and has good adhesive properties. It will retain its flexibility for a long time. For instance, laminated material comprising rawhide fibre and varnished cambric cemented in accordance with my invention and prepared over a year ago is still flexible and shows no signs of cracking or bending. The cementing composition itself may be kept for a relatively long period of time without deterioration. It is also a good electrical insulator.

It will be obvious to those skilled in the art that my cementing composition may be applied to any materials requiring an adhesive of its properties and characteristics and in any known manner. It will likewise be obvious to those skilled in the art that other fatty acids of drying or semi-drying oils or the oils themselves besides linseed and China-wood oils may be used in preparing the modified alkyd resin. Similarly, it will be obvious that other degelled oils, besides degelled linseed oil may be used as for example, degelled cottonseed and castor oils, and still fall within the scope of my invention.

What I claim as new and desire to secure by Letters Patent of the United States, is:

1. A cementing composition consisting of an alkyd resin and a degelled oil homogeneously blended but uncombined with with said resin.

2. A cementing composition consisting of an alkyd resin and a degelled drying oil homogeneously blended but uncombined with said resin.

3. A cementing composition consisting of a glycerine-phthalic anhydride resin and degelled linseed oil homogeneously blended but uncombined with said resin.

4. A cementing composition consisting of a glycerine-phthalic anhydride resin modified by the addition of a drying oil or drying oil acid during its preparation, and a degelled drying oil homogeneously blended but uncombined with said resin.

5. A cementing composition consisting of the product of reaction of phthalic anhydride, glycerine, linseed oil fatty acids and China-wood oil fatty acids, said product being blended but uncombined with a quantity of degelled linseed oil.

6. A cementing composition consisting of the product of reaction of phthalic anhydride, glycerine, linseed oil and China-wood oil, said product being blended but uncombined with a quantity of degelled linseed oil.

In witness whereof, I have hereunto set my hand this 8th day of August, 1929.

LESTER V. ADAMS.